United States Patent

[11] 3,620,623

[72] Inventors Robert B. Reams, Jr.
Silver Spring, Md.;
Charles H. Klute, Washington, D.C.
[21] Appl. No. 31,633
[22] Filed Apr. 24, 1970
[45] Patented Nov. 16, 1971
[73] Assignee The United States of America as
represented by the Secretary of the Army

[54] OPTICAL SYSTEM FOR INTERMIXING
DISSIMILAR STEP-AND-REPEAT PATTERNS
20 Claims, 3 Drawing Figs.
[52] U.S. Cl. .................................................. 355/53,
353/37, 355/43, 355/45, 355/46
[51] Int. Cl. ............................................................ G03b 27/46
[50] Field of Search ............................................. 353/37;
355/40, 43, 44, 45, 46, 53

[56] References Cited
UNITED STATES PATENTS
2,744,443  5/1956  Higonnet et al. ............... 355/43
3,390,608  7/1968  Jonker et al. .................... 355/43
1,959,498  5/1934  Planskoy .......................... 355/43 X
Primary Examiner—Samuel S. Matthews
Assistant Examiner—Edna M. Bero Attorneys—Harry M. Saragovitz, Edward J. Kelley, Herbert Berl and J. D. Edgerton ABSTRACT: A step-and-repeat camera system for automatically intermixing dissimilar unit patterns on a photomask for use in the fabrication of solid-state electronic microcircuits. The system provides for the use of a number of different secondary unit patterns mounted in light boxes whose optic axes are directed towards reflecting means located along a principal optic axis. The reflecting means, which can take the form of a number of different embodiments, are precisely aligned to reflect the desired secondary image towards a photosensitive plate that is successively stepped to each of its matrix positions before exposure. The entire system is automated by means of a numerical tape control unit that positions the photosensitive plate, positions the reflecting means and actuates the desired light box according to a preprogrammed tape. After the usual preliminary alignments, the different patterns can be mixed automatically in any desired manner on a single photosensitive plate. Several embodiments are disclosed, ranging from a two-pattern mix to a five-pattern system, and the system of the present invention can easily be extended to include larger mixes.

INVENTORS,
ROBERT B. REAMS, JR.
CHARLES H. KLUTE

OPTICAL SYSTEM FOR INTERMIXING DISSIMILAR STEP-AND-REPEAT PATTERNS

RIGHTS OF GOVERNMENT

The invention described herein may be manufactured, used, and licensed by or for the United States Government for governmental purposes without the payment to us of any royalty thereon.

BACKGROUND OF THE INVENTION

This invention relates generally to photographic apparatus and more particularly to step-and-repeat photographic apparatus for fabricating photomasks necessary in the manufacture of solid-state integrated electronic microcircuits.

The basic process for making such photomasks is relatively well known in the art. The step-and-repeat camera is an essential part of such a process in which a precisely cut master pattern is reduced to small dimensions and replicated into a matrix of patterns on a photosensitive plate for subsequent transfer to the semiconductor material. The photosensitive plate is stepped to each position in the matrix while the pattern is exposed after each step. The system of the present invention solves the problem of automatically and in a predetermined manner introducing dissimilar unit patterns into the matrix of repeated patterns of the photosensitive plate, a process that has heretofore been manual. For example, in the case of a two-pattern mix, the principal unit pattern was repeated over the whole matrix of the photosensitive plate except at positions in which were desired the secondary unit pattern. The negative of the principal unit pattern was manually removed from the photorepeater after which the negative of the secondary unit pattern was inserted, and the step-and-repeat motion of the photorepeater was repeated to make exposures of the secondary unit pattern in the blank spaces left in the first operation. Certain problems of pattern placement was inherent in such a manual operation and were usually solved by accurately prealigning the respective negatives on precision-machined carriers which functioned as gage blocks to correctly position both sets of negatives and their images in the matrix. That procedure wasted much time and defeated the purpose of the other automatic features of the photorepeated. The problems were multiplied when more than two patterns had to be intermixed on one matrix.

It is therefore an object of the present invention to provide an automatic system for intermixing different unit patterns on a photorepeated photomask for use in the fabrication of solid state electronic microcircuits.

Another object is to provide an optical system for intermixing dissimilar step-and-repeat patterns that is highly accurate and that requires no manual intervention subsequent to preliminary adjustments.

SUMMARY OF THE INVENTION

Briefly, in accordance with the invention, a step-and-repeat camera system is provided for intermixing different unit patterns on a photomask such as those used in the fabrication of integrated circuits. The problem that this invention solves is that of introducing dissimilar patterns into the matrix of repeated patterns in a predetermined manner and moreover doing this automatically. Secondary patterns are introduced at certain angles to a principal optic axis and upon command are reflected towards a photosensitive plate by reflecting means located at the intersection of the axes. A number of different geometries and constructions are available that are within the scope of the invention. For example, the reflecting means may be a simple first-surface mirror or a half-silvered mirror. Additionally, a multielement frame may be used with a mirror juxtaposed in each frame so as to reflect its associated pattern. The operation of the system including the stepping of the photosensitive plate, the positioning of the reflecting means, and the exposure of the light sources, is automatically controlled by a numerical tape control unit that is commanded by a preprogrammed tape. In this way, the patterns can be automatically intermixed upon a single plate in any predetermined manner. By providing each light source equidistant from the reflecting means, plural focusing problems are largely eliminated. Alignment procedures are simplified by a microscope, micrometers and remote-controlled angular adjustments.

BRIEF DESCRIPTION OF THE DRAWINGS

The specific nature of the invention as well as other objects, aspects, uses and advantages thereof will clearly appear from the following description and from the accompanying drawings in which.

DESCRIPTION OF THE PREFERRED EMBODIMENTS

Figure 1:
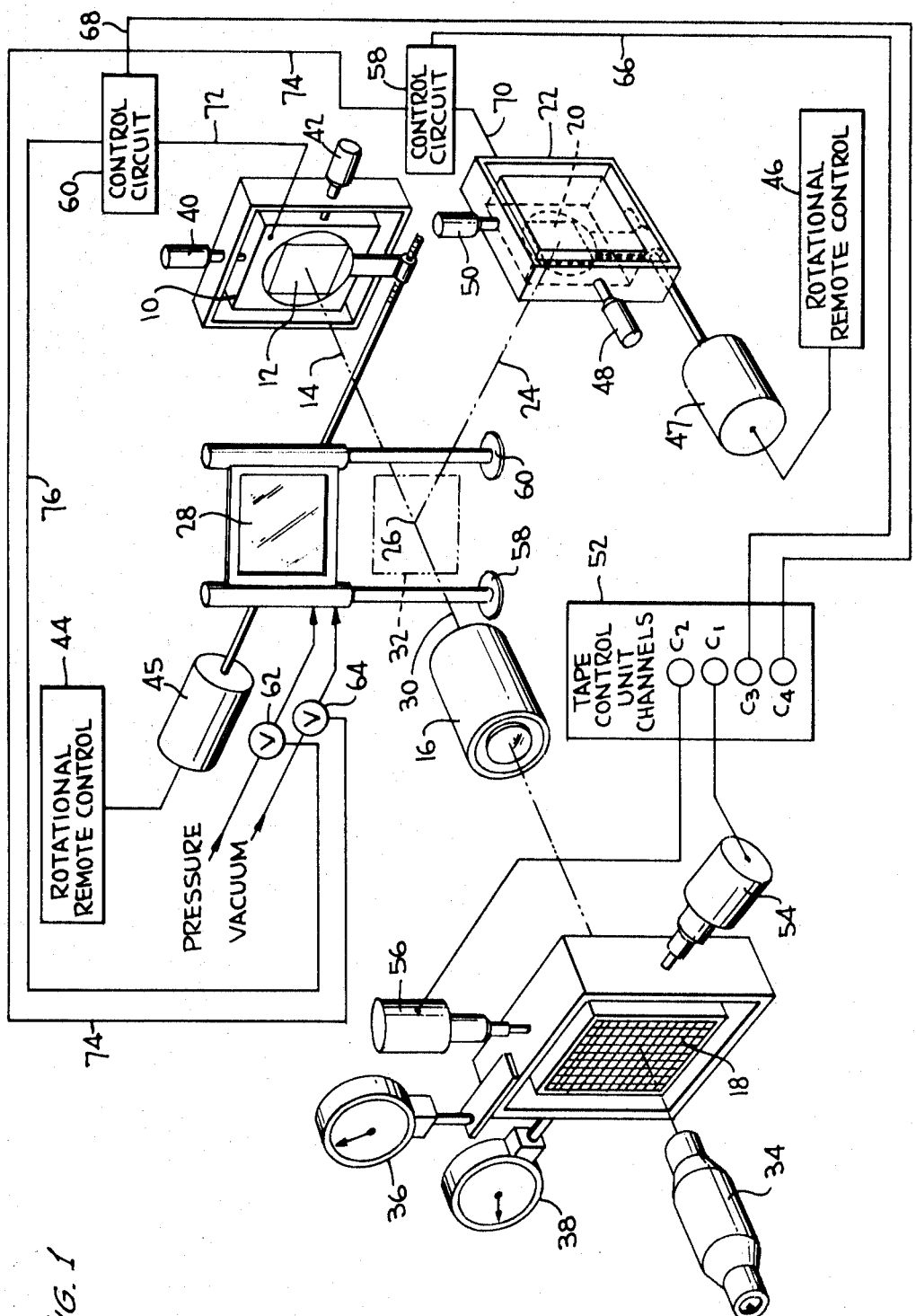
FIG. 1 is a perspective view showing the essential components of a preferred embodiment of the optical system of the present invention.

FIG. illustrates the essential elements of an automatic two-pattern intermixing system embodying the present invention. Supporting members and many incidental mechanical parts are omitted for simplicity.

In a first light box 10 is mounted a first reduction negative 12 of the desired principal unit pattern. The image of negative 12 is projected by light box 10 along the principal optic axis 14 and focused through a lens tube 16 onto a photosensitive plate 18. A second reduction negative 20 of the desired secondary unit pattern is mounted in a second light box 22 whose secondary optic axis 24 is set at 90° to principal optic axis 14. Each of the negatives 12 and 20 contain indexing marks at their corners for alignment purposes. A movable first-surface mirror 28 is located precisely at an angle of 45° to both optic axes at their point of intersection 26, so that when first-surface mirror 28 is lowered to position 32, the image of negative 20 is reflected thereon and becomes coincident with the path of the image along the principal optic axis 30 just before it enters lens tube 16. (A first-surface mirror is one which has the reflection coating on its front face and is utilized here to prevent the reflection of a double image as would occur from an ordinary mirror.) Mirror 28 moves up and down along an axis accurately vertical to the plane of the two optic axes 14 and 24. The mirror's supporting posts 58 and 60 provide air pressure-vacuum piston means for positioning mirror 28 and are controlled by solenoid valves 62 and 64 that are, in turn, actuated by a master tape control unit 52 as explained further below. The path segments of the principal 14 and secondary 24 optic axes from their respective light boxes to their point of intersection 26 are made equal so that when the lens in lens tube 16 focuses the image of negative 12 on photosensitive plate 18, the image of negative 20 will also be in focus. The image which is formed on photosensitive plate 18 can be critically focused at the desired position in the matrix. The location of the image in the matrix is ascertained from dial gauges 36 and 38 which indicate its positional coordinates on plate 18. A traveling microscope 34 is located behind photosensitive plate 18 and is equipped with cross hairs and vertical and horizontal micrometer adjustments (not shown). Microscope 34 is used to bring the indexing marks of each pattern into coincidence at any predetermined point in the matrix, thus ensuring angular and positional alignment of the images with respect to each other and with respect to plate 18. Any necessary horizontal and vertical placement adjustments are made on negative 12 by means of micrometers 40 and 42, while the negative's angular position about optic axis 14 can be adjusted by means of a rotational remote control 44 that drives a stepping motor 45. In a similar manner, the positional and angular alignment of negative 20 is controlled by micrometers 48 and 50 and by a rotational remote control 46 that drives a stopping motor 47.

Automatic control of the system is achieved by means of a numerical tape control unit 52 which issues commands according to a preprogrammed tape containing at least four channels C1, C2, C3 and C4. Channels C1 and C2 command the X and Y stepping motors 54 and 56, respectively, which shift photosensitive plate 18 to each successive position of the matrix prior to the exposure of the desired negative. Channels C3 and C4 command control circuits 58 and 60, respectively, which regulate light boxes 22 and 10 and which also control the mirror position appropriate to each light box by means of valves 64 and 62. That is, mirror 28 is lowered and raised on command from control circuits 58 and 60 by way of lines 74 and 76, respectively. Tape control unit 52 then switches on the associated light box through its control circuit and thus determines, at a particular point in the repeated matrix, whether the image on plate 18 will be that of negative 12 or that of negative 20. The two negatives can be intermixed in any manner desired merely by programming the tap accordingly. Control circuits 58 and 60 receive tape commands by way of lines 66 and 68, respectively, and turn on their light sources by way of lines 70 and 72, respectively, for preadjusted times to achieve the best exposure. They also provide a short time delay after translation of plate 18 to allow mechanical vibrations to damp out. After each exposure, a short delay is provided to allow the afterflow of the lamp to decay.

Assuming mirror 28 is initially in the "up" position as shown in FIG. 1, and upon the activation of tape control unit 52, a typical sequence of operations will be as follows: exposure of negative 12; X-translation of plate 18 to the second position in the matrix; second exposure; step-and-repeat, etc. When the tape calls for the insertion of the image from negative 20 (the secondary unit pattern), mirror 28 is automatically lowered before the exposure is made and is raised just afterward. At the end of one row of exposures on the matrix of plate 18, the tape commands a Y-translation so that a second row of exposures can be made. Upon the completion of the exposures of all matrix positions in this way, tape control unit 52 returns plate 18 to the starting position and shuts the equipment off.

Figure 2:
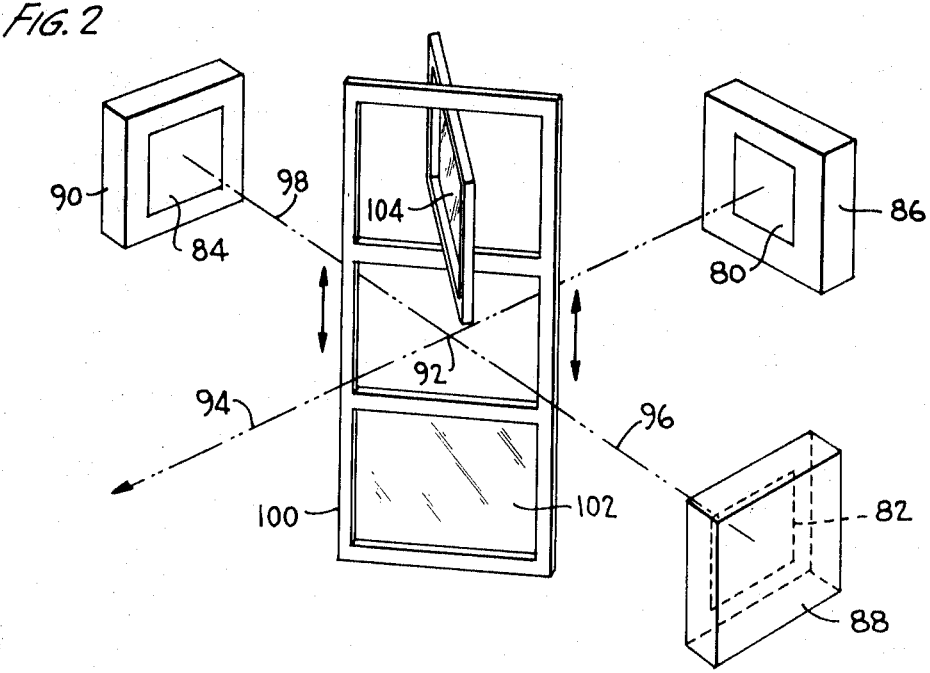
FIG. 2 illustrates in skeletal form another possible embodiment of the present invention.

FIG. 2 shows an extension of the basic concepts advanced by the present invention in another embodiment that can automatically intermix three different unit patterns on a single photosensitive plate in a predetermined manner. It is seen in FIG. 2 that most of the detail as shown in FIG. 1 has been omitted since the basic structure and automative means can be essentially of the same type, with certain obvious modifications. The three unit pattern negatives 80, 82 and 84 are mounted in light boxes 86, 88 and 90, respectively, which are located equidistant from the point of intersection 92 of their respective optic axes. Assume optic axes 96 and 98 of the secondary and tertiary unit patterns intersect the primary optic axis 94 at right angles, although it is understood that other angles can be utilized. In a plane accurately perpendicular to the plane of the optic axes 94, 96 and 98 is a three-element frame 100 positioned at an angle of 45° with respect to optic axis 94 and whose vertical movement can be controlled in a manner similar to that of mirror 28 in FIG. 1. In the lowermost element of frame 100 is a mirror 102; the middle element is vacant; the uppermost element contains a rotatable mirror 104 that is precisely adjusted to be at an angle of 90° with respect to frame 100. The operation of the three-pattern system of FIG. 2 is analogous to the two patten system of FIG. 1 with modifications to the control system to accommodate three light sources and three frame positions. If exposure of the image from negative 82 is desired on the photosensitive plate (not shown), frame 100 is shifted upwards so that mirror 102 intersects the image from light source 88 at point 92 and reflects it along optic axis 94. Similarly, if exposure of the image from negative 84 is desired, frame 100 is shifted downwards so that mirror 104 intersects the image from light source 90 at point 92 and reflects it along optic axis 94. If exposure of the image from negative 80 is desired, frame 100 remains in its "neutral" middle position so that the image from light source 86 travels unobstructed through frame 100 along optic axis 94 to he photosensitive plate. The system of FIG. 2 can be extended, for example, to include other light boxes positioned at various angles to but equidistant from point 92. This would require either a precise control system for varying the angular position of a single rotatable mirror at point 92, or a multielement frame with its mirrors prepositioned at the desired angles in order to achieve precise alignment of the reflected images on the photosensitive plate, or a combination of the foregoing.

Figure 3:
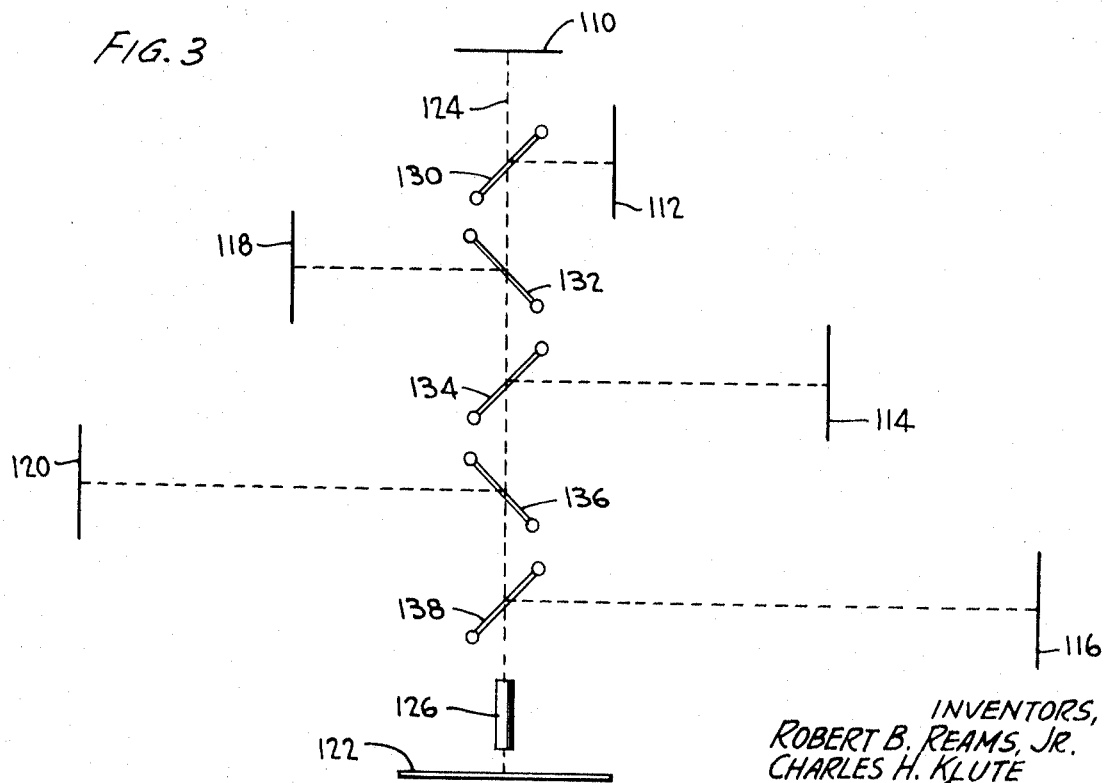
FIG. 3 shows diagrammatically another embodiment that extends the basic concept advanced by the present invention.

FIG. 3 shows in an overhead view another multipattern intermixing system embodying the present invention. Illustrated are six light boxes at 110, 112, 114, 116 118, and 120 that contain unit patterns to be intermixed in a predetermined manner on a photosensitive plate 122. The secondary optic axes of light boxes 112, 114, 116, 118, and 120 are set at 90° to the principal optic axis 124 of light box 110. At each intersection of a secondary optic axis with principal optic axis 124 is located a moveable first-surface mirror 130, 132 etc. of the type aforedescribed in connection with FIG. 1. The point of intersection of each optic axis pair is chosen so that the path distances from the light boxes to said point of intersection of their respective optic axes is equal. As hereinbefore explained, this is to assure that after one pattern negative has been focused through lens tube 126, all others will be in focus at plate 122. Obvious modification to the control system of FIG. 1 is necessary to handle the six light boxes and five movable mirrors of FIG. 3. The operation is again analogous to the original two-pattern system. Assuming all mirrors are initially in the "up" position, the negative in light box 110 can be exposed the desired number of times while the plate 122 is stepped through its matrix positions. If insertion in the matrix of the pattern in light box 120 is desired, for example, a control circuit (not shown) commands mirror 136 to lower and switches on light box 120 to expose the negative on plate 122. That is, all mirrors remain in the "up" position until the corresponding secondary unit pattern is needed in the matrix, at which time its associated mirror is lowered to reflect its image from its light box towards plate 122. It is clear that the system of FIG. 3 can be extended to intermix a larger number of secondary unit patterns merely by increasing the length of the principal optic axis 124 and by adding light boxes and mirrors adjacent to it. Alternatively, a multielement frame such as disclosed in FIG. 2 could be substituted for the mirrors. This would increase the useable number of unit patterns in FIG. 3 to 11 with, of course, the addition of five light boxes.

It is apparent that we have provided an automatic system for intermixing a potentially large number of different unit patterns on a photo repeated photomask that has wide application in the field of integrated circuit fabrication. Obviously, many different combination of reflectors and light boxes are possible, with geometry and space as the primary limitations. The embodiments disclosed above use an air pressure-vacuum piston, controlled by solenoid valves, to raise and lower the mirrors. Other control devices will occur to skilled persons. It is clear that a half-silvered mirror that would pass one image and reflect another without movement could be adopted for the system of the present invention, providing attenuation and resolution difficulties could be overcome. Also, other photorepeating cameras using flash sources that expose the photosensitive plate while it is in motion are directly adaptable to the system of the present invention.

We wish it to be understood that we do not desire to be limited to the exact details of construction shown and described, for obvious modifications will occur to persons skilled in the art.

We claim as our invention:

1. A step-and-repeat camera system for intermixing different unit patterns on a photomask, comprising:
   a. means for projecting the image of a principal unit pattern negative along a principal optic axis, said means comprising a negative holder that is adjustable in the horizontal and vertical directions and is angularly adjustable above said principal optic axis;

b. a photosensitive plate having a plurality of matrix positions and located along said principal optic axis;
c. means located in front of said photosensitive plate for focusing the image traversing said principal optic axis onto one of said matrix positions;
d. means for shifting said photosensitive plate for successively aligning each of said matrix positions directly in the path of said focused image;
e. means for projecting the image of a secondary unit pattern negative along a secondary optic axis which intersects said principal optic axis at a definite angle thereto, said means comprising a negative holder that is adjustable in the horizontal and vertical directions and is angularly adjustable about said secondary optic axis;
f. reflecting means located in a plane perpendicular to the plane formed by said principal optic axis and said secondary optic axis, positioned at an angle thereto so as to reflect the image from said secondary optic axis onto said principal optic axis towards said photosensitive plate; and
g. means for positioning said reflecting means whereby said reflecting means intersects said plane formed by said optic axis whenever the image of said secondary unit pattern is desired to be exposed upon said photosensitive plate.

2. The invention according to claim 1 wherein said reflecting means comprises a first-surface mirror.

3. The invention according to claim 1 wherein said reflecting means comprises a half-silvered mirror.

4. The invention according to claim 2 wherein said positioning means comprises an air pressure-vacuum piston system.

5. The invention according to claim 4 wherein said air pressure-vacuum piston system is actuated by means of solenoid valves.

6. The invention according to claim 4 wherein said means for projecting the image of a principal unit pattern negative further comprises a first light box and a first stepping motor for controlling said angular adjustments.

7. The invention according to claim 6 wherein said first stepping motor is remotely controlled.

8. The invention according to claim 4 wherein said means for projecting the image of a secondary unit pattern negative further comprises a second light box and a second stepping motor for controlling said angular adjustments.

9. The invention according to claim 8 wherein said second stepping motor is remotely controlled.

10. The invention according to claim 4 wherein said shifting means comprises third and fourth stepping motors.

11. The invention according to claim 1 further comprising automatic means for controlling the operation of said step-and-repeat camera system.

12. The invention according to claim 11 wherein said automatic means comprises a numerical tape control unit that translates a preprogrammed tape into commands for driving said shifting means and for controlling first and second control circuits whereby said system automatically exposes said principal unit pattern after said photosensitive plate has been shifted and exposes said secondary unit pattern after said photosensitive plate has been shifted, according to the commands from said preprogrammed tape.

13. The invention according to claim 12 wherein said first and second control circuits translate the commands from said numerical tape control unit into signals for actuating
a. said means for projecting the image of a principal unit pattern negative;
b. said means for projecting the image of a secondary unit pattern negative; and
c. said means for positioning said reflecting means.

14. The invention according to claim 1 further comprising a microscope located behind said photosensitive plate for focusing and aligning said principal unit pattern negative and said secondary unit pattern negative within one of said matrix positions.

15. The invention according to claim 1 further comprising a plurality of secondary light sources each for projecting a unit pattern negative along its respective optic axis.

16. The invention according to claim 15 wherein all of said secondary light sources are located equidistant from said reflecting means.

17. The invention according to claim 16 wherein said reflecting means comprises a multiframe member, a first frame of which is clear to allow passage of the image of said principal unit pattern negative, the other frames each containing a mirror positioned so as to reflect the image from its respective secondary optic axis onto said principal optic axis towards said photosensitive plate.

18. The invention according to claim 16 wherein said reflecting means comprises a rotatable mirror that is positioned and controlled so as to reflect the image from the desired secondary optic axis onto said principal optic axis towards said photosensitive plate.

19. The invention according to claim 15 further comprising a plurality of reflecting means each of which is located at the intersection of said principal optic axis and its respective secondary optic axis and perpendicular to the plane formed by said pair of axes, positioned at an angle to its respective secondary optic axis so as to reflect its image onto said principal optic axis towards said photosensitive plate.

20. The invention according to claim 19 wherein each of said reflecting means is equidistant from its respective secondary light source and said means for projecting the image of a principal unit pattern negative.

20. The invention according to claim 19 wherein each of said reflecting means is equidistant from its respective secondary light source and said means for projecting the image of a principal unit pattern negative.

* * * * *